No. 671,066. Patented Apr. 2, 1901.
C. GRAF.
LENS.
(Application filed Jan. 4, 1901.)

(No Model.)

$P^1 \ N^1 \ N^2 \ P^2$ $P^3 \ N^3 \ N^4 \ P^4$ $P^1 \ N^1 \ N^2 \ P^2 \quad P^2 \ N^2 \ N^1 \ P^1$ $P^3 \ N^3 \ N^4 \ P^4 \quad P^4 \ N^4 \ N^3 \ P^3$ Christoph Graf
Inventor Witnesses

UNITED STATES PATENT OFFICE.

CHRISTOPH GRAF, OF CLOSTER, NEW JERSEY.

LENS.

SPECIFICATION forming part of Letters Patent No. 671,066, dated April 2, 1901.

Application filed January 4, 1901. Serial No. 42,041. (No model.)

*To all whom it may concern:*

Be it known that I, CHRISTOPH GRAF, a citizen of the United States, and a resident of Closter, in the county of Bergen and State of New Jersey, have invented certain new and useful Improvements in Lenses, of which the following is a specification, reference being had to the drawings forming a part hereof.

This invention relates to lenses for optical purposes; and it has for its object the production of an achromatic aplanatic lens with a perfect astigmatic correction and a larger relative aperture than lenses heretofore made.

Figure 1:
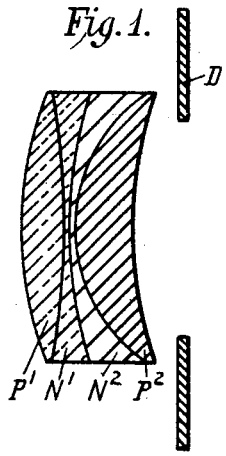
Figure 3:
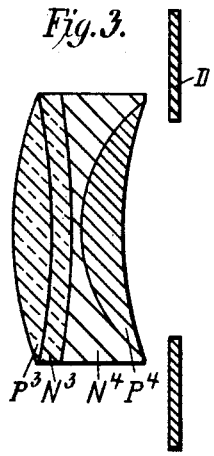
Figure 2:
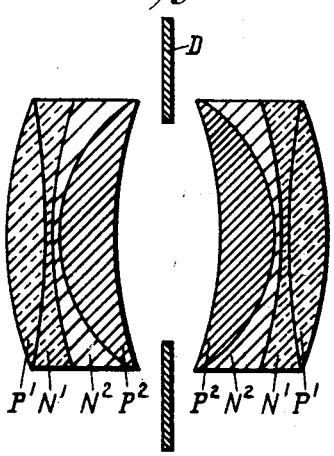
Figure 4:
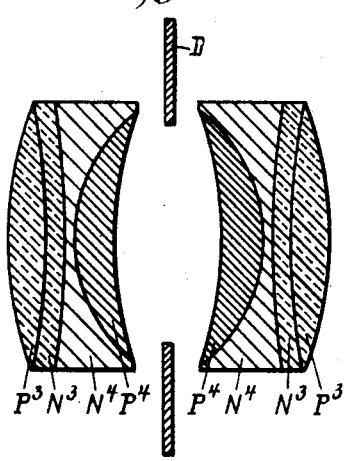

In the drawings, Figure 1 is a sectional view of one form of my compound lens. Fig. 2 is a sectional view of two lenses such as shown in Fig. 1 combined as a double objective. Fig. 3 is a sectional view of another form of my compound lens. Fig. 4 is a sectional view of two lenses such as shown in Fig. 3 combined as a double objective.

Similar characters indicate similar parts throughout the views.

My compound objective is composed of four lenses, two positive and two negative, the two negatives being juxtaposed and lying between the two positives. Each of the lenses is of a different refracting power, the two outer positive lenses having one the highest and the other the lowest refracting power of the set. The two negative lenses are therefore of intermediate refracting power and are so disposed in the combination that the negative lens of the less refracting power is adjacent to the positive lens of the highest refracting power, while the negative lens of the greater refracting power is adjacent to the positive lens of the least refracting power. The lenses are cemented each to its neighbor or neighbors.

In the form shown in Fig. 1, P', the first positive, is a double-convex or collecting lens of crown-glass, with a refractive index of about 1.61. N', the first negative, is a double-concave dispersing-lens of flint-glass, with a refractive index of about 1.53. N², the second negative, is a diverging meniscus lens of flint-glass, with a refractive index of about 1.57. P², the second positive, is a converging concavo-convex or collecting meniscus of crown-glass, with a refractive index of about 1.51. As seen in the drawings, the lenses N' N² are in contact, located between the lenses P' P², the lens P' being in contact with the lens N' and the lens P² being in contact with the lens N².

In a symmetrical double combination, with the outer vertices separated, as shown in Fig. 2, the diaphragm D is placed midway between the two lenses. A lens so made may be worked with an aperture of about F 5.5. For a single lens the diaphragm D may be placed before the lens P², as shown in Fig. 1.

In the modification shown in Fig. 3, P³, the first positive, is a double-convex or collecting lens of crown-glass, with a refractive index of about 1.61, as in the lens shown in Fig. 1. N³, the first negative, is a concavo-convex dispersing-lens of flint-glass, with a refractive index of about 1.53. N⁴, the second negative, is a double-concave dispersing-lens of flint-glass, with a refractive index of about 1.57. P⁴, the second positive, is a converging concavo-convex or collecting meniscus of crown-glass, with a refractive index of about 1.51, as in Fig. 1. The lenses N³ N⁴ are in contact, located between the lenses P³ P⁴, the lens P³ being in contact with the lens N³ and the lens P⁴ being in contact with the lens N⁴. As with the lens of Fig. 1, the diaphragm D may be located before the lens P⁴. This modified lens may likewise be used in a symmetrical double combination, as shown in Fig. 4, the diaphragm D being placed midway between the two lenses.

Having described my invention, what I claim as new, and desire to secure by Letters Patent, is—

1. A compound lens, consisting of four single lenses juxtaposited, each of a different refracting power, the two inner lenses being negative, and of intermediate refracting power, and the two outer lenses being positive, one of the highest refracting power, and the other of the lowest refracting power, substantially as described.

2. A compound lens, consisting of four single lenses juxtaposited and cemented together, each of a different refracting power, the two inner lenses being negative and of different refracting powers, the outer lens adjacent to the negative lens of less refracting power being positive and of the highest refracting power, and the outer lens adjacent to the negative lens of greater refracting power being positive and of the least refracting power, substantially as described.

3. A compound lens, consisting of four single lenses juxtaposited and cemented together, each of a different refracting power, the first lens being a double convex and of the highest refracting power, the second lens, adjacent thereto, being a double concave of the third highest refracting power, the third lens, adjacent to the second lens, being a diverging meniscus of the second highest refracting power, and the fourth lens, adjacent to the third lens, being a converging meniscus of the fourth or least refracting power, substantially as described.

In testimony whereof I have signed my name, in the presence of two subscribing witnesses, this 18th day of December, 1900.

CHRISTOPH GRAF.

Witnesses:
CHAS. P. SCHMID, Jr.,
THEODORE T. DORMAN.